March 26, 1968 — G. J. HAUGHT — 3,374,584
DRUM-TUMBLER HOLDER

Filed June 30, 1965 — 2 Sheets-Sheet 1

INVENTOR.
GLENN J. HAUGHT
BY
ATTORNEY

March 26, 1968     G. J. HAUGHT     3,374,584
DRUM-TUMBLER HOLDER
Filed June 30, 1965     2 Sheets-Sheet 2
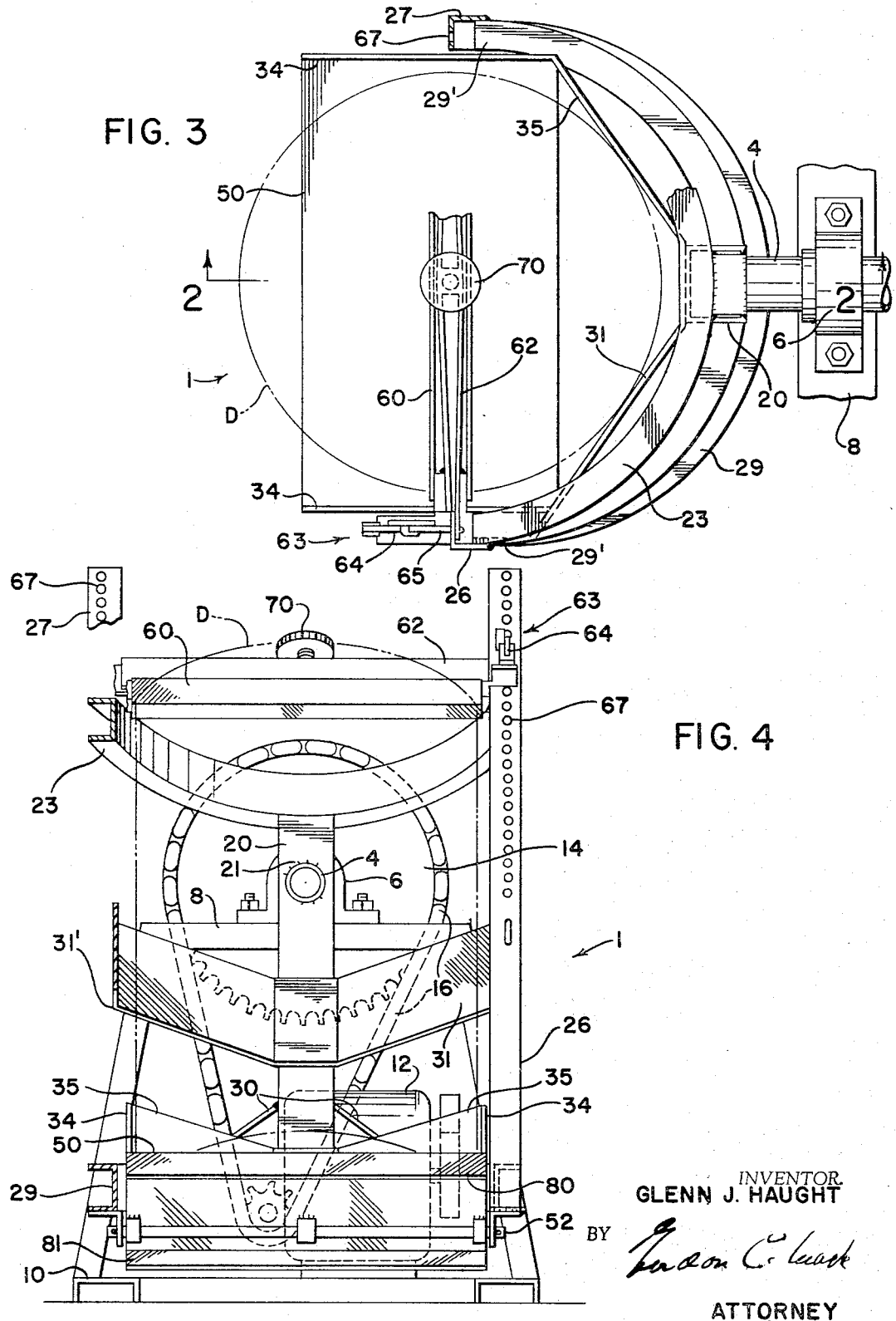
INVENTOR.
GLENN J. HAUGHT
BY
ATTORNEY United States Patent Office 3,374,584
Patented Mar. 26, 1968

3,374,584
DRUM-TUMBLER HOLDER
Glenn J. Haught, Cuyahoga Falls, Ohio, assignor, by mesne assignments, to U.S. Stoneware Inc., a corporation of Massachusetts
Filed June 30, 1965, Ser. No. 468,350
1 Claim. (Cl. 51—164)

ABSTRACT OF THE DISCLOSURE

A drum-tumbler holder having a generally hemi-cylindrical cradle structure tilted in one direction, and a bottom for the holder having a fulcrum pivotally connected to opposite sides of the cradle structure, and two unequal levers extending from the fulcrum, the greater of the levers extending away from the cradle structure so that the bottom, under the influence of gravity, is normally tilted in a direction opposite to the direction in which the cradle structure is tilted.

---

This invention relates to a drum-tumbler holder which is an improvement over the type of drum-tumbler holder disclosed in Wentz U.S. Patent 3,086,332.

The drum-tumbler holder of the present application is similar to that described in the patent in being adapted to hold drums in two cradles at the opposite ends of a horizontal revolvable shaft, the cradles being tilted and parallel and disposed at 180° relative to each other in order to more or less balance one another. On rotation of the shaft, the cradles are eccentrically rotated, simultaneously, tumbling the drum contents.

The supports for the bottoms of the drums in the cradles, as described in the patent, are rigidly fixed in the holders, and in loading and unloading these holders the drums must be lifted onto and off of these supports. In the commercial adaptation of that holder, these supports have been hinged to the cradles at their rears.

According to the present invention, the bottom supports are pivoted to the cradle. Instead of being pivoted at their rear edges, each is pivoted at both of its sides to the cradle adjacent to its bottom, and the pivots are just behind the center of gravity of the support so that the bottom dips forward when there is no drum on it. Therefore, a drum need not be lifted when being loaded, but is only tilted sufficiently to rest on the support, and also in unloading the drum is not lifted but is only tilted. In loading, after resting on the bottom in the tilted position, the drum is pushed toward the cradle until its center of gravity passes over the pivot line of the bottom, and then it drops by gravity into the cradle. Gravity holds it in the cradle so that it is not necessary to strap it in place, as is necessary with the present commercial adaptation. A clamp is tightened against the top of the drum to hold it tight against the bottom support and, for safety, a chain is strapped around its middle. In unloading, the clamp is loosened, the drum is tilted outwardly on the pivoted bottom, and when the outward and unsupported edge of the drum has touched the floor, the drum is removed from the cradle without it being necessary to lift it.

The holder is more convenient to use than that of the prior art. It is more serviceable than the holder of the prior art, and may be lighter in weight. Because the bottom support is pivoted to the cradle at its sides a lighter construction is possible than is required by the hinge arrangement of the commercial adaptation.

The invention is further described in connection with the accompanying drawings, in which—

FIGURE 3 is a top view of the end of the tumbler shown in FIGURE 2, a portion of the top and middle of the cradle being broken away to show the bottom construction; and FIGURE 4 is an end view of the tumbler on line 4—4 of FIGURE 1 with the left portion broken away.

Figure 1:
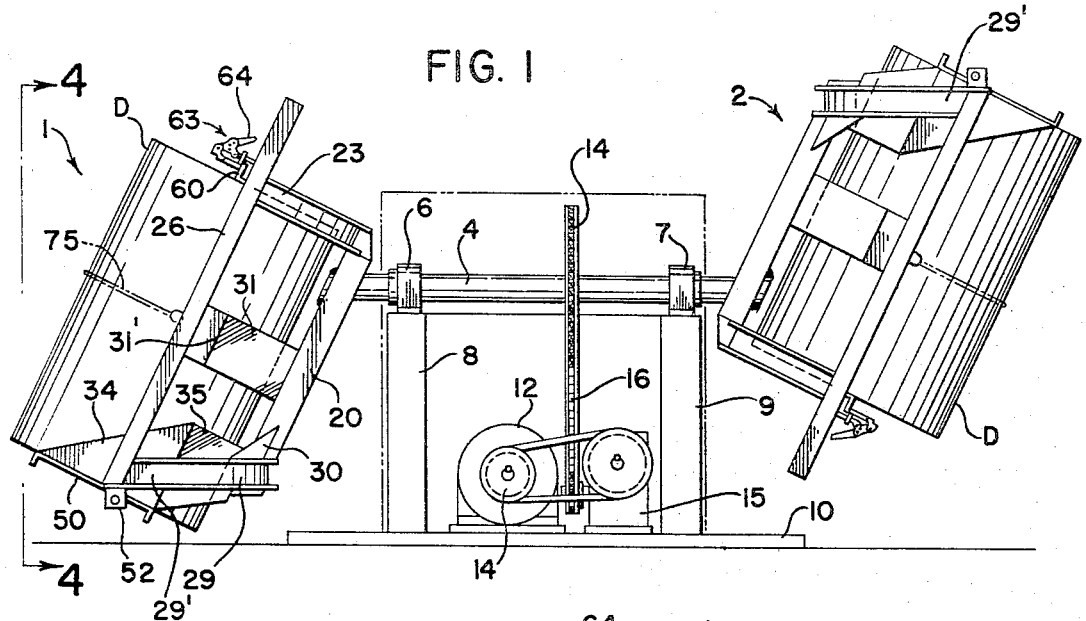
FIGURE 1 is an elevation of the holder with a drum in each cradle.

In the drawings the two cradles 1 and 2 are mounted parallel to one another and disposed at 180° to each other at the opposite ends of the tubular shaft 4 which is carried in the bearings 6 and 7 mounted on the supports 8 and 9. These supports are fastened to base 10. The motor 12 drives the sprocket 14 through a gear reduction in box 15 and the chain 16.

The cradle construction is optional. It is shown with a tubular bottom 20. The shaft 4 passes through openings in first one wall of this bottom and then into the opposite wall of the tube and is welded there by a fillet 21 to the outside of said opposite wall. The angle which the cradle makes with the drive shaft 4 is optional but usually the top of the cradle will be inclined inwardly at an angle of about 25° to the shaft. The curved channel 23 supports the upper ends of the angle irons 26 and 27. The bottoms of these angle irons 26 and 27 are welded to the channel 29 at the straight extensions 29'. Channel 29 is welded to the tube 20 and reinforced by gusset plates 30. The wide middle band 31 of the cradle which is bent along lines 31' to form a cradle, is welded to the tube 20 and the angle irons 26 and 27.

Triangular plates 34, fastened to the lower cradle 35 are cut away at the bottom along the line 38 to obtain swing clearance. The plates 34 hold the cradle 35 to the bottom support plate 50. This is pivoted to the bottom of the cradle sides by pivot rods 52. As shown, this pivot is located to the rear of the center of gravity of the bottom 50 so that the forward portion of this bottom falls forward when the holder is not in use.

Figure 2:
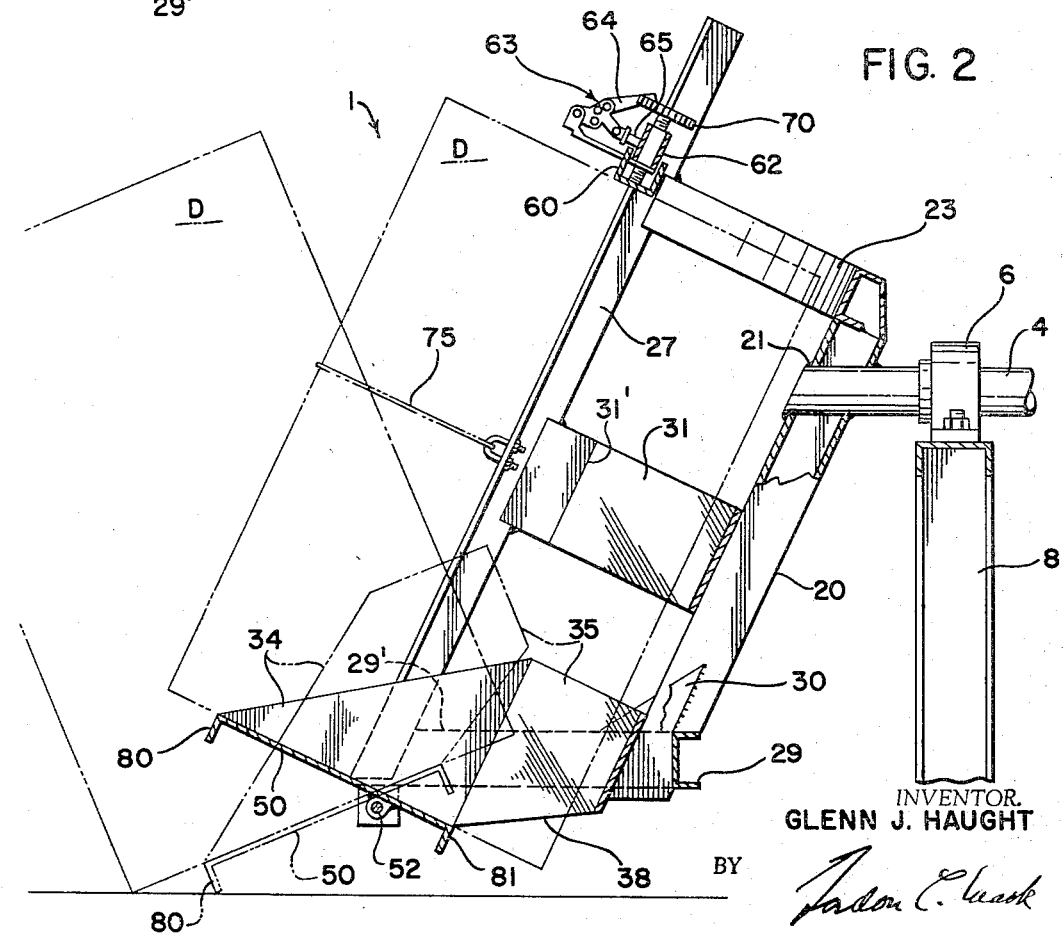
FIGURE 2 is an enlarged section on the line 2—2 of FIGURE 3 of one end of the holder showing a drum in phantom in the cradle and also showing the drum in phantom resting on the support in the process of being loaded or unloaded.

To load the holder, drum D (FIGURE 2) is rolled or otherwise positioned in front of a cradle and tipped away from the cradle and then it is lowered onto the support 50, as shown in phantom in FIGURE 2. The support need not be centered in the bottom of the drum. The drum is then pushed into the cradle, causing bottom 50 to pivot, and the drum seats itself firmly against the cradles 31 and 35. When the drum is resting in the cradle, the top clamp or crossbar channel 60 is brought into pressure contact with the top of the drum to press it tight against the bottom support 50. This is preferably done by first bringing the crossbar to approximately the right position, and then tightening it into place. Any suitable means can be used. The drawings show crossmember 62 slidable along angle irons 26 and 27, with a toggle 63 at each end of this member operated by handle 64 which moves a pin 65 into and out of openings 67 in angle iron 26, 27. The crossmember 62 is adapted to nest within channel 60. After the approximate position has been reached, handwheel 70 is turned to press the crossbar 60 into tight contact with the top of the drum. Thus pressure is applied to the top of the drum to hold it firmly against the bottom support 50. This not only holds the drum in place but it maintains the tiltable bottom support 50 tight against the bottom of the drum so long as pressure is applied. Then if a safety device such as chain 75 is provided, it is fastened in place.

With drums in both of the cradles, the motor 12 is started and the contents of the drums are subjected to intensive tumbling. When the operation is completed, first one cradle and then the other is brought to the upright position. When in the upright position, the handwheel 70 which operates the clamp held against that drum is loosened, the handles 64 are raised to release the crossbar and then it is slipped away from the drum with tube 62. When it has been moved a sufficient distance from the top of the drum, the drum is tipped forward on the base 50 until its edge contacts the floor. Then it is rolled or otherwise removed from the vicinity of the holder.

The exact structure of the bottom support 50 is optional so long as it is pivoted at its sides to the sides of the cradle and its center of gravity is outward from the pivot. It may be of any desired area and shape and it is advantageously provided with a front leg such as the leg 80 which holds its front edge off the floor when loading and unloading a drum. As shown, the support 50 is made of a flat plate, the front edge of which is bent down at 80 to keep the front edge of the support from touching the floor. The rear edge is bent down at 81. Flanges 80 and 81 strengthen the support.

The invention is covered in the claims which follow. What I claim is:

1. In a drum-tumbler holder comprising a generally hemicylindrical cradle structure adapted to receive a drum, motive means operatively connected to said cradle structure for end-over-end rotation thereof, said cradle structure having an upright position wherein its cross-sectional plane is displaced from the horizontal in a first angular direction, the improvement comprising, a bottom for said holder, having a fulcrum pivotally connected to opposite sides of said cradle structure, and two unequal levers extending from said fulcrum, the greater of said levers extending away from said cradle structure, whereby said bottom, under the influence of gravity, is normally angularly disposed with respect to the horizontal in a direction opposite to said first angular direction.

References Cited

UNITED STATES PATENTS

| 136,416 | 3/1873 | Claussen | 248—139 |
| 3,086,332 | 4/1963 | Wentz | 51—164 |

FOREIGN PATENTS 459,901      Canada.

HAROLD D. WHITEHEAD, *Primary Examiner.*